(12) United States Patent
Sempere et al.

(10) Patent No.: US 9,495,572 B2
(45) Date of Patent: Nov. 15, 2016

(54) IDENTIFYING ONE- OR TWO-DIMENSIONAL BAR CODES VIA WEIGHTED IMAGE DATA COMBINATION

(71) Applicant: SICPA HOLDING SA, Prilly (CH)

(72) Inventors: Pablo Sempere, Thoiry (FR); Amine Zahar, Paris (FR); Andras Szappanos, Bottens (CH); Oliver Francois, Lausanne (CH)

(73) Assignee: SICPA HOLDING SA, Prilly (CH)

( * ) Notice: Subject to any disclaimer, the term of this patent is extended or adjusted under 35 U.S.C. 154(b) by 0 days.

(21) Appl. No.: 14/892,672

(22) PCT Filed: May 21, 2013

(86) PCT No.: PCT/EP2013/060384
§ 371 (c)(1),
(2) Date: Nov. 20, 2015

(87) PCT Pub. No.: WO2014/187474
PCT Pub. Date: Nov. 27, 2014

(65) Prior Publication Data
US 2016/0098585 A1    Apr. 7, 2016

(51) Int. Cl.
G06K 7/10 (2006.01)
G06K 7/12 (2006.01)
G06K 7/14 (2006.01)

(52) U.S. Cl.
CPC ....... *G06K 7/10722* (2013.01); *G06K 7/10851* (2013.01); *G06K 7/10861* (2013.01); *G06K 7/12* (2013.01); *G06K 7/146* (2013.01); *G06K 7/1413* (2013.01); *G06K 7/1417* (2013.01); *G06K 7/1443* (2013.01); *G06K 7/1447* (2013.01); *G06K 7/1465* (2013.01)

(58) Field of Classification Search
CPC ............ G06K 7/10; G06K 9/18; G06K 9/36; G06K 9/80; G06K 19/00; G08C 21/00; G06F 17/00
USPC .............. 235/462.07, 462.01, 462.09, 462.1, 235/375, 487
See application file for complete search history.

(56) References Cited

U.S. PATENT DOCUMENTS

| | | | |
|---|---|---|---|
| 2004/0125413 A1* | 7/2004 | Cordery | G06K 1/121 358/3.28 |
| 2010/0213259 A1 | 8/2010 | Gao | |
| 2012/0000983 A1* | 1/2012 | Bhagwan | G06K 7/10851 235/462.04 |
| 2012/0211555 A1* | 8/2012 | Rowe | G06K 7/1404 235/375 |
| 2012/0312877 A1 | 12/2012 | Zolotov | |

* cited by examiner

*Primary Examiner* — Edwyn Labaze
(74) *Attorney, Agent, or Firm* — Greenblum & Bernstein, P.L.C.

(57) ABSTRACT

A method for identifying a one- or two-dimensional barcode in input image data, the method comprising the steps of: obtaining first image data of a first image of the object, said first image being acquired using a first illumination wavelength; obtaining second image data of a second image of the object, said second image being acquired using a second illumination wavelength being different from said first illumination wavelength; calculating a weighting factor based on a statistical processing of pixel values of the first image data and pixel values of the second image data; and generating third image data by calculating a weighted combination using the pixel values of said first image data, the pixel values of said second image data, and said weighting factor.

17 Claims, 8 Drawing Sheets

IDENTIFYING ONE- OR TWO-DIMENSIONAL BAR CODES VIA WEIGHTED IMAGE DATA COMBINATION

TECHNICAL FIELD

The present invention relates to identifying a one- or two-dimensional barcode in input image data. Specifically, the present invention relates to corresponding methods, barcode reading devices, computer programs, and computer program products. Embodiments of the present invention employ image processing of digital image data of images taken of an object with a barcode attached.

BACKGROUND

Figure 1A:
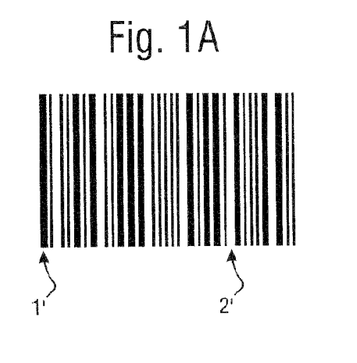
FIGS. 1A and 1B show schematic views of exemplary conventional bar codes.
Figure 1B:
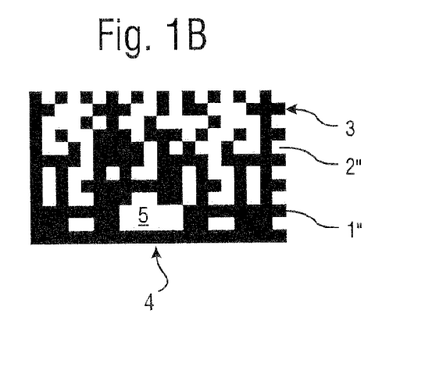

One- and two dimensional bar codes are commonplace today in marking, tracking, and authenticating objects, such as consumer products, food goods, beverage packs, cans and bottles, cigarette packages and other tobacco products, documents, certificates, money bills and the like. Bar codes appear in various fashions, of which two examples are shown in FIGS. 1A and 1B: The common one-dimensional bar code of FIG. 1A usually comprises an arrangement of elements as, for example, black and while lines 1', 2'. Information is encoded by concatenating pre-defined groups of black and white lines 1', 2' of varying thickness and distance. These groups are usually associated to a specific character or meaning by some kind of industry standard.

FIG. 1B shows a common two-dimensional bar code that encodes information by means of arranging, in general terms, first type elements 1" and second type elements 2", such as rectangles, dots, triangles and the like, along two dimensions in some sort of ordered grid. The example of FIG. 1B follows an implementation according to the GS1 (Trademark) DataMatrix ECC 200 standard (GS1 being an international association providing standards for two-dimensional barcodes). This standard, for example, employs a so-called "L finder pattern" 4 (also called L-shape solid line, L-line, solid line, etc.) and a so-called "clock track" 3 (also called clock line, L-shape clock line etc.) surrounding the data 5 that carries the actual payload data of the bar code.

In both cases of one-dimensional and two-dimensional bar codes, at least two distinguishable types of elements are used. For example, a white-printed square as a first type element may represent the information 0, whereas a black-printed square as a second type element represents the information 1. In any way, however, implementations by means of black and white lines or dots (elements) represent just one way of example.

Specifically, the bar codes can be well implemented also by using color and/or fluorescent dyes or inks, thermo printing on heat-sensitive paper, mechanical means, such as milling, embossing, grinding, or physical/chemical means, such as laser etching, acid etching, etc. Any type of implementation is possible as long as the elements can be distinguished into their respective type in, for example, image data that has been obtained from the two-dimensional bar code being normally attached to some kind of object (good). For example, a digital camera can obtain digital image data of the bar code that is printed on a paper document or laser-etched on a metal can.

Once the barcode is attached to an object, the encoded information can then be later retrieved by means of barcode reading devices. Such devices usually first obtain said image data that was acquired using, for example, the already mentioned digital camera. Other acquisition support may be provided by means of illumination devices, such as LEDs, lasers and other light sources. The barcode reading devices may then employ processing resources, e.g. in the form of a microprocessor (CPU) and an associated memory, for processing the obtained image data. Usually, such processing involves isolating (identifying) the barcode in the image data and decoding the payload data. The decoded data can then be further processed, displayed, or transmitted to other entities.

Such image processing usually involves the separation of the barcode image section from the background surface, which, in turn may comprise similar features as they are part of the product label or package design. For example, a conventional technique considers a simultaneous imaging a barcode from three different illumination directions using multiple illumination colors. There, three monochrome images are simultaneously acquired and a processor determines which of the images provides the most optimum contrast and thus is assumed to be the best decodable image. Moreover, the conventional arts also consider the calculation of a linear combination of images for the specific case that fluorophores are employed.

Besides reliability, i.e. the figure that characterizes the fraction of successfully and/or correctly decoded barcodes from a given number of input images, also other considerations may play a considerable role. Amongst others, also process efficiency and speed may determine whether or not a way of image processing is suitable for barcode identification and/or decoding.

Therefore, there is a need for improved concepts of barcode identification and/or decoding in image data. These concepts need to provide satisfactory output reliability whilst meeting strict requirements of processing speed, i.e. the time required between obtaining and image and providing a processing result.

SUMMARY OF THE INVENTION

The mentioned problems are solved by the subject-matter of the independent claims. Further preferred embodiments are defined in the dependent claims.

According to one embodiment of the present invention, a method is provided for identifying a one- or two-dimensional barcode in input image data, the method comprising the steps of: obtaining first image data of a first image of the object, said first image being acquired using a first illumination wavelength; obtaining second image data of a second image of the object, said second image being acquired using a second illumination wavelength being different from said first illumination wavelength; calculating a weighting factor based on a statistical processing of pixel values of the first image data and pixel values of the second image data; and generating third image data by calculating a weighted combination using the pixel values of said first image data, the pixel values of said second image data, and said weighting factor.

According to another embodiment of the present invention, a barcode reading device is provided comprising processing resources configured to identify a one- or two-dimensional barcode in input image data including: to obtain first image data of a first image of the object, said first image being acquired using a first illumination wavelength; to obtain second image data of a second image of the object, said second image being acquired using a second illumination wavelength being different from said first illumination wavelength; to calculate a weighting factor based on a statistical processing of pixel values of the first image data and pixel values of the second image data; and to generate third image data by calculating a weighted combination using the pixel values of said first image data, the pixel values of said second image data, and said weighting factor.

According to further embodiments of the present invention, there are provided a computer program that comprises code, which, when executed on a processing resource, implements a method embodiment of the present invention, and a corresponding computer program product.

BRIEF DESCRIPTION OF THE DRAWINGS

Embodiments of the present invention, which are presented for better understanding the inventive concepts and which are not the same as limiting the invention, will now be described with reference to the figures in which.

DETAILED DESCRIPTION

Figure 2A:
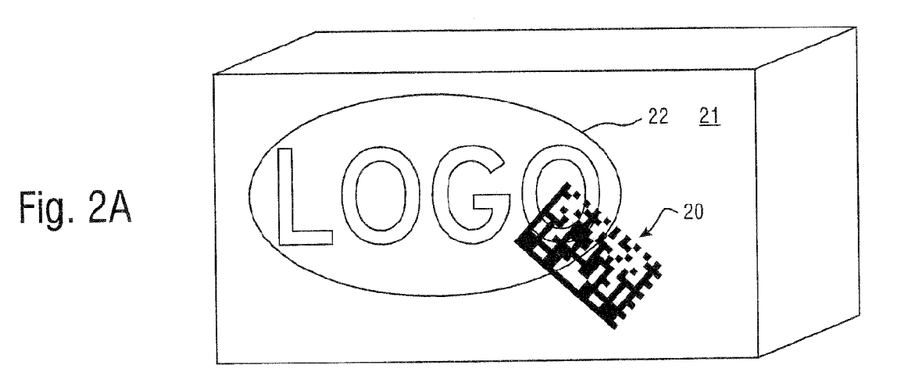
FIGS. 2A and 2B show schematic views of scenarios of a bar code being attached on an exemplary object.
Figure 2B:
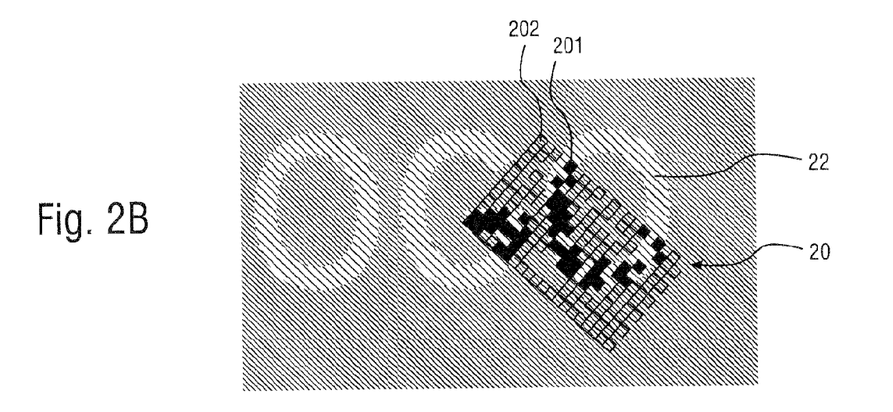

FIGS. 2A and 2B show schematic views of usual scenarios in which embodiments of the present invention can be applied. As shown, two-dimensional barcodes 20, 20' are attached to an object 21. The object 21 can be any markable entitiy to which a bar code can be attached by means of the already mentioned techniques. The exemplary object 21 shown in FIGS. 2A and 2B is a consumer good package, which, along common practice, comprises some design features, such as the shown product logo 22. The barcodes 20, 20' may be attached to the object 21 so as to fully or partially overlap design features such as the logo 21. By means of this example, it is clear that there is no guarantee that the barcode 20, 20' appears in some dedicated area or position that would allow for a given minimum contrast in an image and image data taken form object 21. Rather, the image of the barcode in the image data may overlap with images of other features (logo 22).

FIG. 2A shows an exemplary black-and-white implementation of the barcode 20, whereas FIG. 2B depicts the situation of an "invisible" barcode 20' that is—for example—printed using fluorescent inks that may be invisible to the human eye. Specifically, such inks may produce light with a wavelength to which the human eye is not sensitive, or such inks may require special illumination, e.g. illumination with ultraviolet (UV) or infrared (IR) light, so as to produce light again in an invisible wavelength range or in a visible wavelength range. In the latter case, barcode 20' remains invisible as long as no special illumination is employed.

FIGS. 3A to 3E show schematic views of image data being subject to processing according to an embodiment of the present invention. Generally, at least two images are acquired from the object using different wavelengths. In this way, first image data is obtained of a first image of the object, wherein the first image is acquired using a first illumination wavelength, and second image data is obtained of a second image of the object, wherein this second image is acquired using a different second illumination wavelength. A schematic view of the obtained first image data is given by FIG. 3A, and a schematic view of the obtained second image data is given by FIG. 3B.

It is to be noted that the schematic views of the figure feature in a representative fashion areas of similar pixel values by means of corresponding hatching density. For example, areas with dense hatching may represent areas with "dark" or comparatively low pixel values, whereas areas with less dense hatching may represent areas with "bright" or comparatively high pixel values. It is, in any way, arbitrary whether comparatively low pixel values represent dark colors, bright colors, high or low intensities, high or low saturations, or other figures known and common in digital image processing. One common image processing rules considers pixel intensities varying inside a value range of 0 to 255 (i.e. the scope of 1 byte). Generally, pixel values being computed to negative values can be set to 0, and, likewise, pixel values exceeding 255 can be set to 255.

Figure 3A:
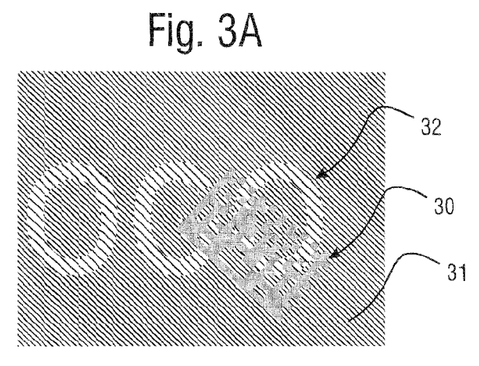
FIGS. 3A to 3E show schematic views of image data being subject to processing according to an embodiment of the present invention.
Figure 3B:
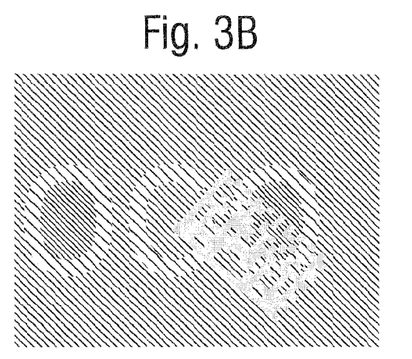
Figure 3C:
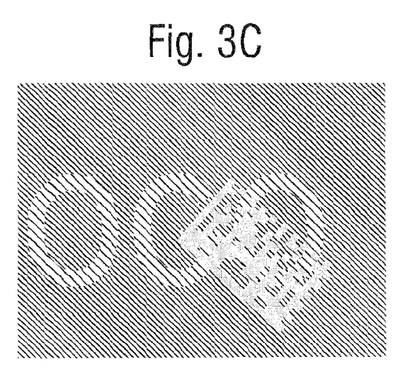
Figure 3D:
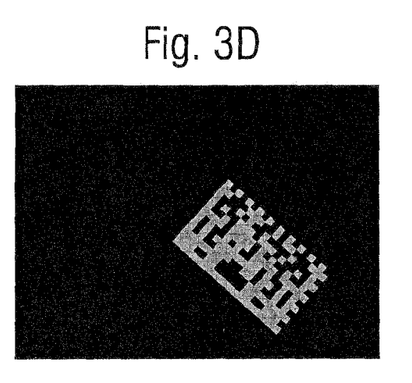
Figure 3E:
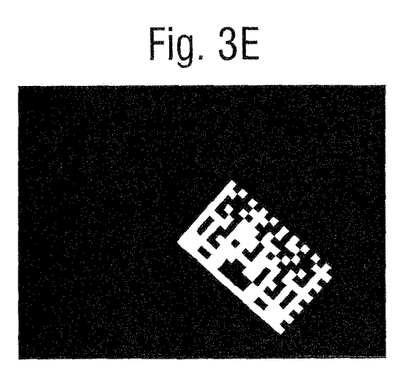

According to an embodiment of the present invention, the two sets of first and second image data are obtained shown schematically in FIGS. 3A and 3B acquired with two different illuminations, i.e. wavelengths that may selected from a range or set of various available wavelengths, e.g. the ones that a barcode reading device offers. An object is now to determine a linear combination that maximizes the contrast by providing an image with virtually no background, in the sense that the mainly the barcode part of the image remains and anything else (the background) is removed. Such processed image data can then be advantageously provided to further processing for actually decoding the payload data. The enhancement of the object of interest, i.e. the barcode, in such image data substantially facilitates further processing, since the barcode can be more reliably identified and decoded.

In the case illustrated in FIG. 3A, the elements of one type of the barcode 30 appear with a "light" pixel intensity (or value) while, the background 31 appears "dark". In FIG. 3B, representing the second image data, both barcode elements and the background appear, respectively, darker as compared to in the first image data. For the sake of an exemplary explanation, the pixel value of the barcode element may be assumed in the first and second image data as, respectively, 200 and 120, and the pixel value of the background may be assumed in the first and second image data as, respectively, 60 and 45.

Now, one of said first and second image data is selected to be multiplied by a weighting factor W for further calculating a linear combination along the general equation $$\text{Image3}=F^*(\text{Image1}-W^*\text{Image2}), \quad (1)$$

wherein Image1, Image2, and Image3 represent the entirety of pixel values of one set of image data, W the weighting factor, and F represents an optional scaling factor. Both the weighting factor W as well as the optional scaling factor F are described in greater detail below in conjunction with methods intending to find the optimum values for F and W that maximize the image contrast. In a way, the best pair of parameters (F, W) should be obtained so that, when to the input image data (Image1, Image2), they give a final image with the least background and the best contrast between the barcode dots/lines and the remaining background. The intermediate result (Image1−W*Image2) is referred to as the third image data in embodiments of the present invention and the result of equation (1) is referred to as the fourth image data in embodiments of the present invention.

In equation (1) the image data 1 to 3 is represented by means of a pixel to pixel operation, meaning that for each pixel of the second image data with coordinates (i, j) the respective pixel value is multiplied by W, and then subtracted from the pixel value of pixel (i, j) of the second image data so as to form the pixel value with coordinates (i, j) of the third image data.

The intention is to calculate the weighting factor W in a way that the background pixel values of both image data become similar. Following the above numerical example, setting W to 1.333, will yield image data (W * Image2, shown schematically in FIG. 3C) in which the barcode elements assume a pixel value of 160, while the background assumes value 60. The subsequent subtraction as defined by equation (1) is supposed to provide an image with a vanishing background, i.e. that ideally equals 0, and finite barcode pixel values that are clearly distinguishable, e.g. the value equals 40, as shown schematically in FIG. 3D. The optional multiplication by the scaling factor F of, say, 5 rescales the pixel intensities to 200 as initially for Image1 but keeping background at 0. As shown schematically in FIG. 3E, a clear improvement is obtained as compared to the initial first and/or second image data. In other words, the proposed technique is based on illuminating an object with different colors and collecting the different luminescent responses of background and foreground.

A further exemplary embodiment may consider image acquisition of near-IR (NIR) fluorescent barcodes while illuminating the objects sequentially (non-simultaneously) with red, blue, green, IR and no light. Then a weighting factor W is computed that, multiplied by the image acquired with green illumination, provides a "new" image G'=W*G with comparable background to the image acquired with blue illumination. Then, a subtraction (B−W*G) provides an image free or almost free from background. Finally, the optional multiplicative factor F could again rescale the pixel intensities to provide pixel values that are suitable for further processing.

Flashing a barcode with different colors will usually produce pixel values that are in substance proportional to the excitation spectra of the ink used for printing the barcode (e.g. a measured nominal characteristics). Said excitation spectra can be ink-specific so that the variations of the ink response when excited in red, blue, green or IR will likely be different to the variations of response of the background when exposed to the same colors.

In the exemplary case of fluorescent inks, it can be assumed that luminescent pigments of a possibly also fluorescent background will have their distinguishable excitation spectra so that they only unlikely match the characteristics of the ink specifically employed for printing the barcode (visible or invisible) used. These considerations should allow in most cases for finding an optimized linear combination that equalizes the background and—in turn—enhances the barcode in the image data.

Figure 4A:
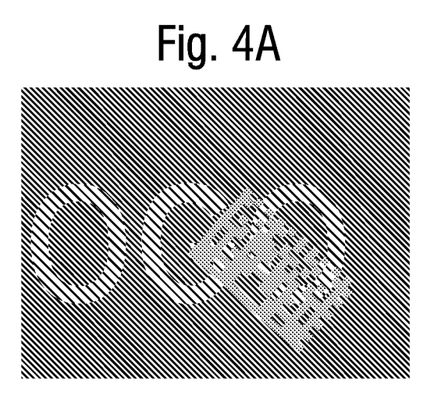
FIGS. 4A to 4C show schematic views of image data being subject to processing according to a further embodiment of the present invention.
Figure 4B:
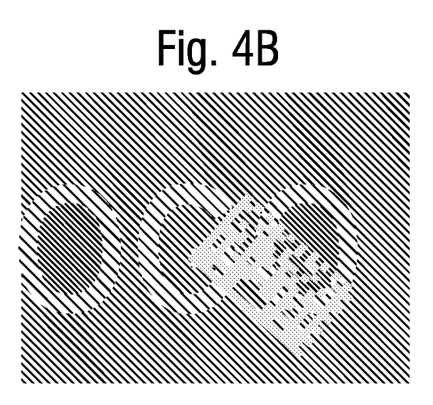
Figure 4C:
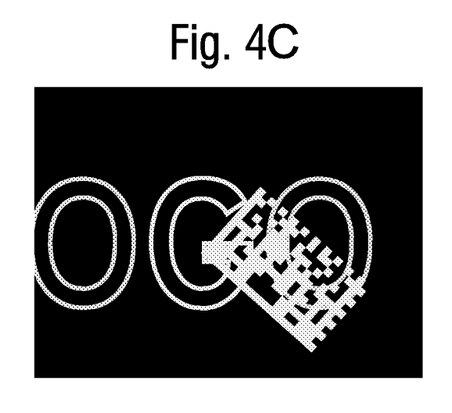

FIG. 4A to 4C show schematic views of additional image data that is considered along another embodiment of the present invention. This embodiment considers in a way a selection of the pair of wavelengths that are used, as it may happen that some parts of the object react rather differently to the employed wavelengths and illumination colors. This may be addressed by a specific selection of a pair of illumination wavelengths (first and second image data) for which all background areas behave similarly.

This problem is specifically illustrated in FIGS. 4A to 4C as compared to FIGS. 3A to 3E. FIG. 4A shows again input image data already available in conjunction with FIG. 3A. However, FIG. 4B shows image data acquired by a third wavelength being different from both aforementioned first and second wavelengths. As can be seen from the schematic representation of FIG. 4C, the subtraction removes most of the background, but a pattern remains that—for example— surrounds the logo. This can be due to the fact some object features are fluorescent when illuminated with one wavelength, while having no fluorescent response when illuminated with another wavelength. Due to such phenomena, some regions may appear bright in one color, but dark for others. It may be therefore preferable to select the appropriate pair of wavelengths beforehand, or, alternatively, acquire more than two images with more than one illumination wavelength and compare the respective outputs (e.g. FIG. 3E vs. FIG. 4C) so as to determine the wavelengths for subsequent or actual use. Considering the outline shape of the respective linear combination results may be one way of making such a selection.

Figure 5:
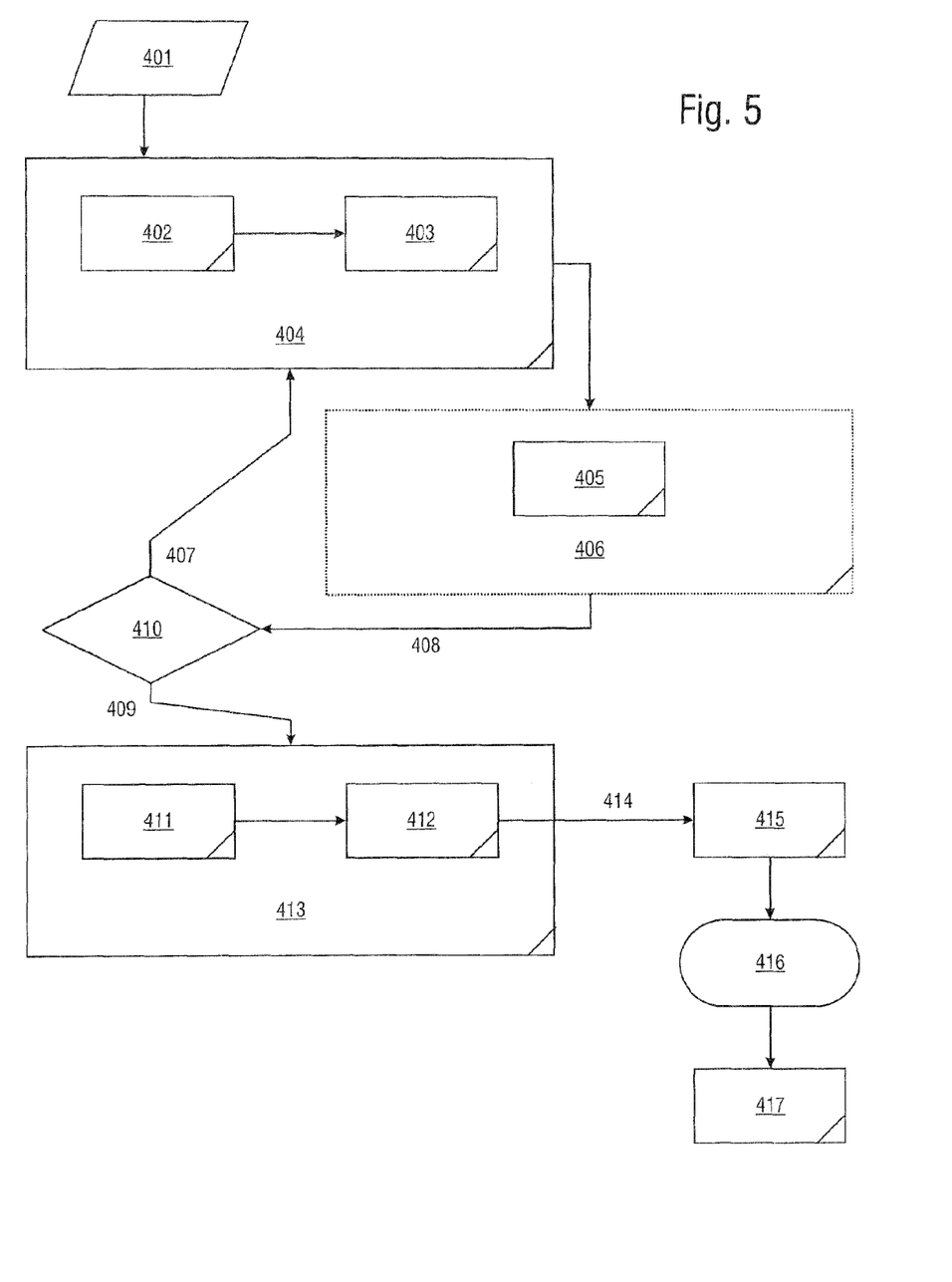
FIG. 5 shows a schematic view of an architecture according to an embodiment of the present invention.

FIG. 5 shows a schematic view of an architecture according to an embodiment of the present invention. In general, such an architecture considers a collection of modules that are implemented, e.g. by means of corresponding sections of instructions or code, for each involved functionality. The shown modules form part of one full workflow process starting from the acquisition of the images and ending with the final image computed and sending this to the decoding engine (further processing).

In 401 ("ENABLE COMBINATION MODE") the proposed mode is enabled along an embodiment of the present disclosure, i.e. along the weighted linear combination of above equation (1). In general, equation (1) was defined for being aimed at removing any background and enhancing the barcode contrast. In a way, this is to obtain a "final" image with a minimal background. In equation (1), the first image data Image1 may be the one that shows the strongest response of the ink/dye used for the barcode, i.e. the object of interest.

In 404 ("IMAGE CAPTURE PROCESS"), a first image is acquired with a first wavelength in 402 ("LightSource1 Image1 Capture"), and a second image is acquired with a second wavelength in 403 ("LightSource2 Image2 Capture"). Through an optional module 406 ("IMAGE QUALITY CONTROL") with algorithm 405 ("Darkness Image Checking Algorithm") corresponding image data is checked for darkness, and the result is checked in 410 ("Image Quality Y/N?"). If not sufficient (407="NO"), the image capture process 404 is repeated. This repetition may be limited by a counter 408 ("N=1, . . . 10").

A module 413 ("FACTOR COMPUTATION", "ALGORITHM MODULE") with algorithm 411 ("Adjustment Background Factors (−) Algorithm W") and algorithm 412 ("Adjustment Image Histogram (*) Algorithm F") receives input image data if "YES" at 409 or directly from process 404. The calculated factors 414 ("W,F") are provided to image processing module 415 ("IMAGE PROCESSING MODULE"), employing a library 416 ("DECODING LIBRARY") and provides the output 417 ("DM CODE", "BARCODE DATA").

The aim of algorithm 411 is to find the best match between the backgrounds of the two images caught. This algorithm will compute the parameter W that will be used to subtract the second image Image2 to the first image Image1. Since each image is illuminated uniformly but with different wavelengths, a real number W can be usually found that matches the backgrounds of the two images. Optionally, one can consider a fraction of the image and corresponding image data with a so-called region of interest (ROI) for finding the parameter W inside the images. An ROI can be employed in order to avoid border effects of the images (the border of the image can be very bright) and to minimize noise impact especially on the corners of the image.

One way of calculating the factor W includes retrieving the histogram of each image (number of pixels of one pixel value vs. pixel value). Based on this histogram, different specific values can be computed. One formula for image matching parameter calculation is given by $$W = \Sigma_i \Sigma_j \text{Image1}_{i,j} / \Sigma_i \Sigma_j \text{Image2}_{i,j}, \quad (2)$$

wherein sum $\Sigma_i$ runs from the minimum X-coordinate value of the ROI to the maximum X-coordinate value of the ROI, sum $\Sigma_j$ runs from the minimum Y-coordinate value of the ROI to the maximum Y-coordinate value of the ROI, Image$1_{i,j}$ is the pixel value of the first image data at coordinate (i, j), and Image$2_{i,j}$ is the pixel value of the second image data at coordinate (i, j).

In a way, W as computed by above equation (2) is indicative of an average difference value of pixel intensity between the two images. This approach can consider that the ink of the barcode may not react in the same way as the background depending on wavelength of the illumination. By trying to equalize the background, one is able to remove most of the background and to keep the barcode. One may also consider that if W is too high then a deterioration of the barcode may occur. Therefore, precision of algorithm is preferably ensured.

Figure 6A:
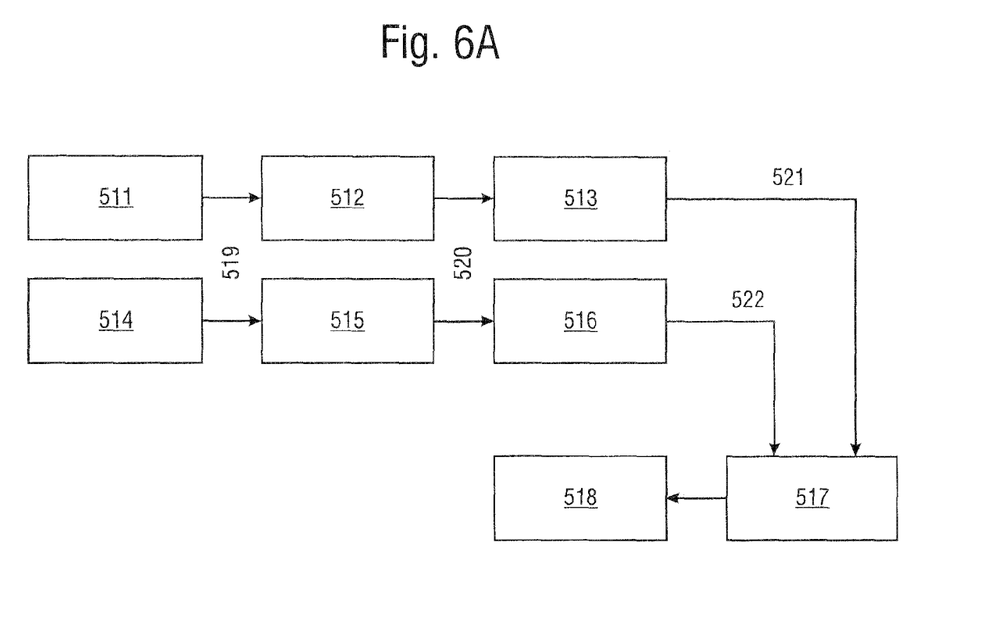
FIGS. 6A and 6B show schematics view of modules according to further embodiments of the present invention.

FIG. 6A depicts one exemplary workflow of the algorithm 411 implemented to find the multiplicative factor W. Specifically the first image data 511 ("Image 1") and the second image data 514 ("Image 2") are subject to image processing 519 ("IMAGE PROCESSING") for obtaining corresponding histograms 512 ("Histogram Image 1") and 515 ("Histogram Image 2"). The histograms 512, 515 are subject to calculation 520 ("CALCULATION") and the respective averages are computed in 513 ("Computation of Average (meanH1) Histogram1 value inside the ROI") and in 516 ("Computation of Average (meanH2) Histogram2 value inside the ROI"). The mean values 521 ("meanH1") and 522 ("meanH2") are the provided for the ratio computation 517 ("Ratio computation: meanH1/meanH2") and the final result 518 ("W") is obtained. After finding the factor W, an optional check can be made made to verify that the value of W is coherent/consistent with given requirements or thresholds.

Alternative ways for calculating the weighting factor include using a mean value of the first image data divided by a mean value of the second image data, a median value of the first image data divided by a median value of the second image data, a minimum value of the first image data divided by a minimum value of the second image data, a standard deviation (StDev) value of the first image data divided by a standard deviation value of the second image data, a mean value of the pixel by pixel ratio between first image data and second image data (i.e. the average of Image$1_{i,j}$/Image$2_{i,j}$), and also calculating a linear regression for a set of X and Y data, e.g. the X dataset being the pixel intensities of Image 1 and the Y dataset being the pixel intensities of Image 2 and calculating the slope of the fitted line as being the scalar W.

The above mentioned examples can be calculated over the entire image data or only over a selected fraction, such as a user defined ROI. Further, calculations can be performed on the histogram of the complete image or complete ROI, or in a respectively truncated histogram. In the latter case, the histogram is truncated using a given percentage of population corresponding to maximum intensities. The percentage of population that will not be taken into account would correspond to:

α=barcode area [in pixels]/ROI area [in pixels].

Thus, an alpha (α) would select upper points in term of intensity and discard them for the computation of the scalar W.

However, also a vector $W=(W_1, \ldots W_n)$ could be employed in the sense of specific values $W_i$ for specific regions. This method allows for selecting from a set of images taken with different illumination wavelengths the pair of the two best-fitting images. The sequence to determine W as an array of several (typically <5) values could be as follows: (1) Obtain different images with different excitations/illumination wavelengths (Image1, Image2, Image3, etc.); (2) Truncate the percentage of population of the histograms as explained above; (3) Select pair of images with closest background based on the correlation between histograms and properties; (4) Determine the local maxima of the pixel intensity histograms in each selected image by using polynomial fits or peak recognition; (5) Identify the regions by isolating the local maxima of the histograms. A region in a pixel intensity histogram corresponds in reality to an interval of pixel intensities (i.e. a spatial region in the image); (6) the algorithm will now have identified a series of regions ($r_i$, with i typically from 1 to 5); for each region determined $r_i$, calculate the ratio between the local maxima in Image1 and Image2. The ratio calculated for region $r_i$ will be $W_i$. Apply these $W_i$ by regions to Image2 and then proceed along equation (1): I1−$W_i$ * I2; and (7) determine F with usual procedure and multiply resultant image by this value.

In other words, the above vectorial W can be further illustrated as follows. The local maxima will probably be at different positions in the histograms of Image 1 and 2. Firstly, one may select the pair of images 1 and 2 that resemble the most amongst all colours available (e.g. are the most similar ones as far as the colours are concerned). For that the following criteria can be used: (1) the number of local maxima should be the same for the pair of images selected even if their positions are different; and (2) the correlation coefficient calculated from the histograms of the 2 images can be the highest. Once an ROI is selected and a histogram is built, one can realize that a red image is different with respect to blue and green, as red may only present some different number of local maxima and may also feature a different histogram profile. Thus, it may be preferable to obtain a correlation coefficient using the green and blue images, since using red and blue or red and green yield comparatively poor coefficients. The correlation can be calculated using histogram data values (only along a y direction) or using arrays given by bin position*value (i.e. x * y), which may ease the discrimination of the best pair of images. The comparison of histograms may thus allow for determining the optimum images to do the vectorial W calculation (e.g. blue and green as above). Once they are selected, one can define regions around the local maxima on the Image 2 (green in this case) and then apply to each region a different ratio given by the local maxima value. Once one multiplies the different regions of Image 2 by this vectorial W, one can produce an image than can be subtracted from Image 1 (blue). A comparison of the result achieved with scalar and vectorial W's may show that a more efficient background subtraction by using the vectorial approach can be obtained.

Figure 9A:
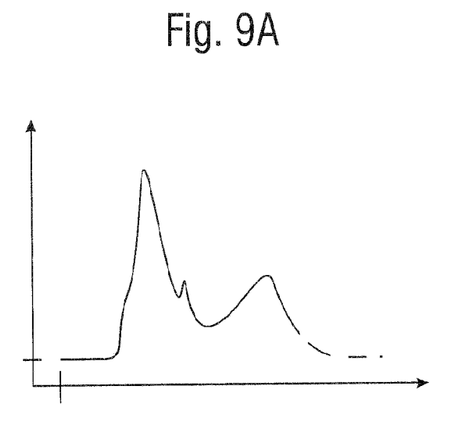
FIGS. 9A to 9D show schematic views of histograms of image data.
Figure 9B:
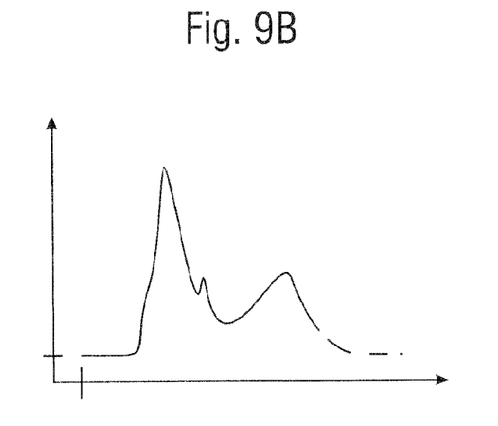
Figure 9C:
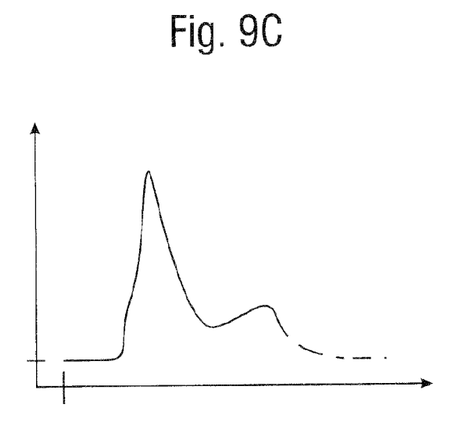
Figure 9D:
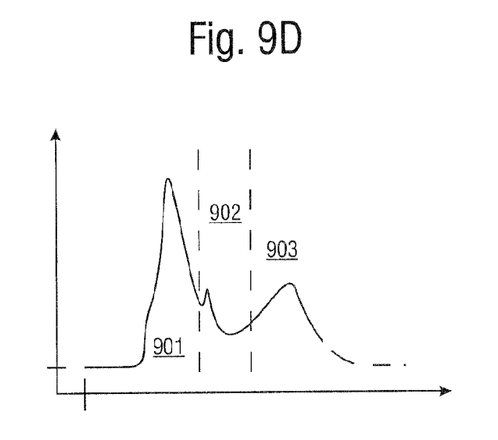

The concepts of similar histograms and properties, such as a local maximum count, are also illustrated in conjunction with FIGS. 9A to 9C showing schematic views of histograms of a green (FIG. 9A with three local maxima), a blue (FIG. 9B with three local maxima), and a red image (FIG. 9C with only two local maxima). The respective dashed lines depict the entire histogram, whereas the solid lines the truncated histograms. The regions are explained in conjunction with FIG. 9D that show three regions 901, 902, and 903 separated with dashed lines around the corresponding local maxima.

Yet further, also a "weight matrix" $W=W_{ij}$ could be employed as in the following. One alternative constitutes a so-called matrix of correction which is used as follows $$W=W_s*(1/2)*[\alpha/(\text{Image1}_{ij}/\text{Image2}_{ij})],$$

where $W_s$ is the scalar W defined in equation (2) and $\alpha$ is the maximum of the ratio $\text{Image1}_{ij}/\text{Image2}_{ij}$. This approach intends to find the matrix W that equalizes the background pixel by pixel but avoiding it to modify the ink dots, i.e. the pixel that represent barcode elements.

Another alternative constitutes a so-called contrast enhancement matrix. For this approach two images are used that are sufficiently similar. A way to determine them can be along one of the described embodiments. Once the two images Image1 and Image2 have been acquired, the ratio $\text{Image1}_{ij}/\text{Image2}_{ij}$ is calculated pixel by pixel. Image2 can be selected as the image where the barcode elements appear with comparatively lower pixel intensity. Then, the contrast of the resulting matrix is enhanced by using conversional techniques such as squaring pixel intensities or histogram equalization. The resulting matrix will be the contrast enhancement matrix W. Then, Image1 (or even a third Image3I is divided by W. This approach intends to find the matrix W that reduces the intensity of background while maximizing the intensity of the dots (barcode elements). Thus, in a way, the matrix W acts as a contrast enhancer. This constitutes a non-linear weighted combination.

In any way, the above examples are specific implementations of statistical processing for calculating the weighting factor W, in its respective scalar, vector or matrix-form, along the embodiments of the invention.

Figure 6B:
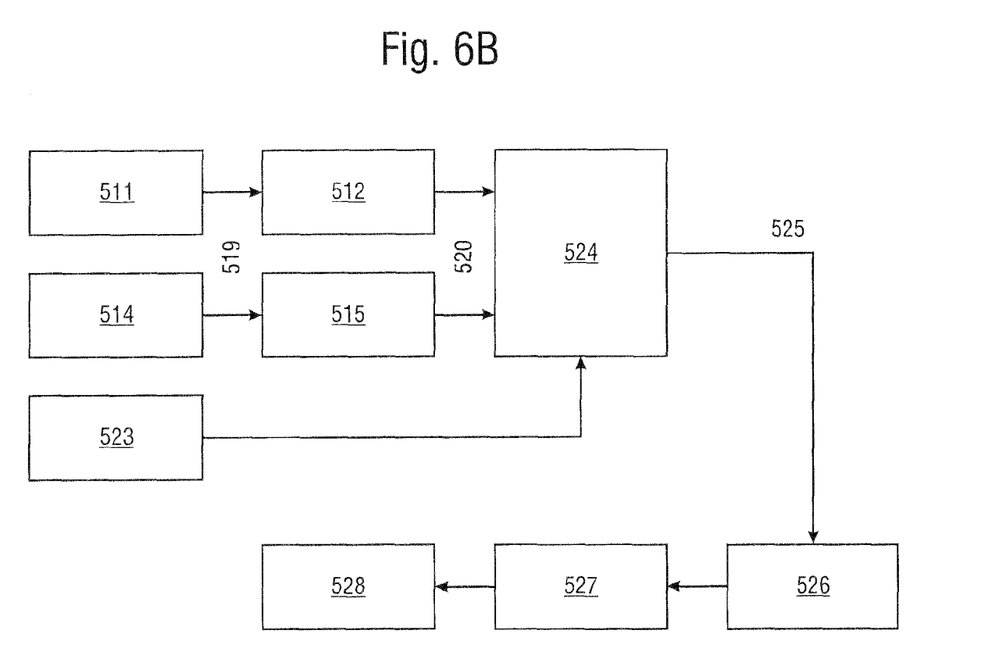

One way of calculating the factor F implementing an algorithm 412 is shown with FIG. 6D. The aim of algorithm 412 should be to enhance even more the contrast between the foreground (barcode) and the background and to provide an image of better quality to the decoding library 416. In a way, image data is linearly stretched by the factor F, which can be computed by:

$$F=255/\ \max_i\max_j(\text{Image1}_{i,j}-W\times\text{Image2}_{i,j}) \quad (3)$$

wherein $\max_i$ yields the maximum and I runs from the minimum X-coordinate value of the ROI to the maximum X-coordinate value of the ROI, and $\max_j$ yields the maximum and j runs from the minimum Y-coordinate value of the ROI to the maximum Y-coordinate value of the ROI, $\text{Image1}_{i,j}$ is the pixel value of the first image data at coordinate (i, j), and $\text{Image2}_{i,j}$ is the pixel value of the second image data at coordinate (i, j). The value 255 in equation (3) is an example for a maximum pixel value given by the bit-length of the used variable type in the image data. Using this value, it can be ensured to stretch the image until the start of having saturated points. After finding the factor F, it can be proceeded to the computation 415 of the final image based on the pair (W, F).

Amongst others, one may consider that the F factor may need to saturate as much as possible the barcode's dots/lines, F should not enhance too much the level of intensity of the background to avoid fluorescence, and that F should be a trade-off between the constraints expressed below Again with reference to FIG. 5, the optional module 406 for image quality control is described. This optional module will check the quality of the image taken in order to verify that the image is compliant with the following algorithms. Module 406 or algorithm 405 may, for example, output a Boolean variable after calculation: A Yes 409 if the image is good enough and then allows the algorithm to proceed to the next step, or a No 409 if the image is not compliant. It will then go to the image capture step 404 and try to take new images. This step may have a maximum number of attempts of, say, 10, try before leaving the algorithm. The maximum value for this loop 408 can be changed by a usder.

The darkness checking algorithm 405 considers cases in which when the input image does not show any object of interest. This can happen at the beginning of streaming objects along a camera, when there is no barcode on the object or no object at all. To consider this case before performing any heavy calculations one may consider to check the average level of intensity of the image and to compare it to a certain threshold. If the average level is below the threshold, it means that the image is too dark to be correct and hence too dark to be treated. Therefore, the test of algorithm 405 may return a negative Boolean. Algorithm 405 may be further described by (1) computing an average level of pixel intensity "$\mu$", (2) compare $\mu$ and a threshold defined by $\lambda=\mu$-threshold; and (3) if $\lambda>0$ then return "FALSE"; else if $\lambda<0$ then return "TRUE".

Figure 7:
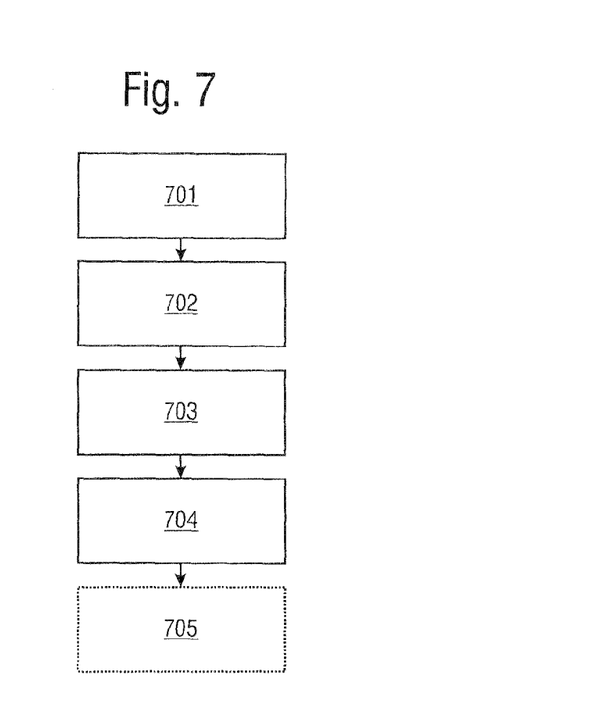
FIG. 7 shows a flow chart of a method embodiment of the present invention.

FIG. 7 shows a flow chart of a method embodiment of the present invention. Specifically, method embodiments of the present invention are intended for identifying a one- or two-dimensional barcode in input image data and for providing an improved output that can be further processed for decoding the payload data of a barcode. These method embodiments consider a step 701 of obtaining first image data of a first image of the object, said first image being acquired using a first illumination wavelength, a step 702 of obtaining second image data of a second image of the object, said second image being acquired using a second illumination wavelength being different from said first illumination wavelength, a step 703 of calculating a weighting factor based on a statistical processing of pixel values of the first image data and pixel values of the second image data; and a step 704 of generating third image data by calculating a weighted combination using the pixel values of said first image data, the pixel values of said second image data, and said weighting factor. An optional step 705 is for calculating fourth image data based on multiplying said third image data by a scaling factor. Either said third or said fourth image data is provided to further processing and/or decoding.

Figure 8A:
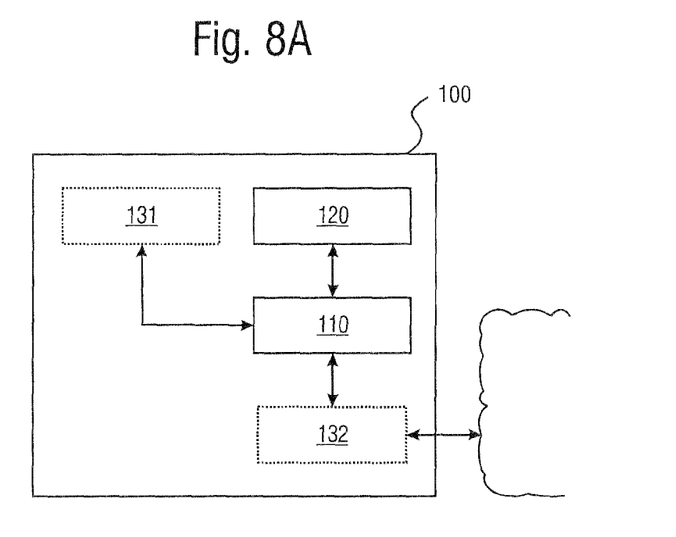
FIGS. 8A to 8C show schematic views of apparatus and device embodiments of the present invention.

FIG. 8A shows a general apparatus embodiment of the present invention. Specifically, there is shown an apparatus 100 comprising a processing unit 110 and a memory unit 120 (processing resources). The memory unit 120 may store code that, when executed on the processing unit 110, implements one or more method embodiments of the present invention. The device 100 may further comprise means for illuminating the object with at least two different wavelengths.

Optionally, the apparatus 100 may comprise an imaging unit 131 for acquiring a digital image of the barcode as being applied, for example, on an object. Further, the apparatus 100 may comprise a communication unit 132 for communicating an identification and/or decoding result to other entities, such as servers, controllers and the like. The communication may be effected over a network, such as a local area network (LAN), wireless network (WLAN), the internet, and the like. Further, also bus systems, such as CAN, can be employed for data exchange.

Figure 8B:
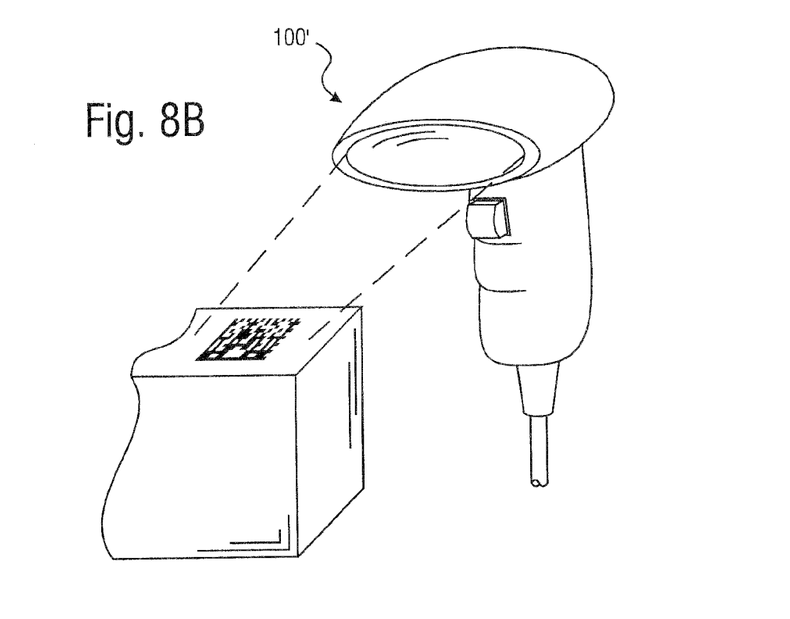

FIG. 8B shows a schematic view of a handheld embodiment of an apparatus for taking an image of the barcode and identifying and (optionally) decoding the same. The apparatus 100' comprises a window through which a digital image of an object can be acquired. A barcode is applied to the object by means of any mentioned printing, mechanical, physical, or chemical method. The apparatus 100' may further comprise an integrated processing unit (not shown) for performing one or more method of embodiments of the present invention. An additional operation element may be provided for switching on and off the apparatus 100' and/or initiating the taking of a picture, acquiring/obtaining respective digital image data, and/or processing of the digital image data so as to identify and/or decode the barcode. The device 100' may further comprise means for illuminating the object with at least two different wavelengths. The device may, of course, take other forms and may be wire-bound or wireless.

Figure 8C:
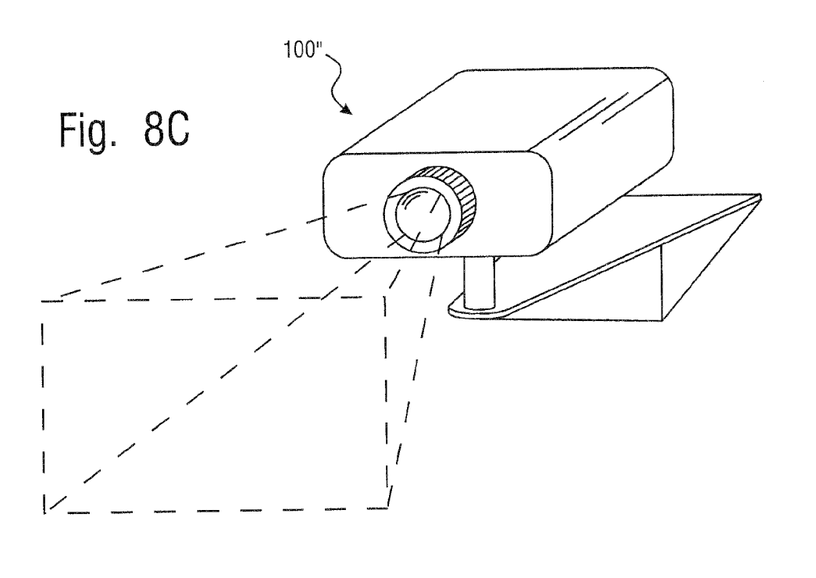

FIG. 8C shows a schematic view of a fixed type embodiment of an apparatus for taking an image of the barcode and identifying and (optionally) decoding the same. Like, for example, a module operable to be mounted on a production/distribution line for identifying barcodes disposed on objects transported on said line. Again, the apparatus 100" comprises a window through which a digital image of an object can be acquired with a barcode. The apparatus 100" may further comprise an integrated processing unit (not shown) for performing one or more method of embodiments of the present invention. An additional fixation element may be provided for mounting the apparatus 100" on, for example, a production line in which a plurality of objects pass by the apparatus 100" for identification. The device 100" may further comprise means for illuminating the object with at least two different wavelengths. According to another embodiment, said means may be configured separated from apparatus 100" so as to account for optimum illumination and image acquisition. The device may, of course, take other forms and may be wire-bound or wireless.

The general concept is to make use of obtaining/acquiring an image of an object while it is sequentially illuminated with several wavelengths and use the difference in response of the sample foreground (barcode) and background to those wavelengths in order to subtract the image background and remain only with the foreground. Once the images corresponding to the different excitation wavelengths are acquired, the way to produce the background subtraction out if this is to use an algorithm that attempts to find the linear combination of the relevant pair of images that equalizes the background while keeping the foreground different so that a subtraction of images would leave only the foreground on the image (the background being totally or partially removed). Once the background is removed, the resulting image with an improved contrast can be sent to the decoding engine.

In the following, examples are given in which the proposed teachings provide a distinct benefit. The situations in which the present technique can help decoding barcodes on complex backgrounds which are normally failing to decode with a standard include the case of black ink on complex fluorescent background. One example to show how this can help to decode complex caps are problematic in that objects have not only a background that fluoresces when excited in red, but also when excited in blue. Results are substantially improved, since the optimum weighted combination found clearly improved the image contrast, especially when compared to the standard image that should be used for decoding corresponding to a specific illumination wavelength. In the trail, the standard blue or red images for the object were undecodable due to the strong background yielding a strong barcode modulation but also due to the presence of a sell-by date on top of barcode. However, the resulting image can clearly improve the situation and eventually can render the image data decodable.

A further scenario may consider black ink on translucent PET caps under sunlight, which can be problematic due to the solar spectrum extending from the deep UV to the far IR. As long as the employed devices are sensitive in a portion of this spectrum, the device can sense this sunlight which potentially affects the quality of the imaged barcode. Also, this types of caps (object) suffer most from sunlight, in that PET caps can be partially transparent to IR radiation. Therefore, when exposed to strong sunlight the barcode dots imaged will merge with the bright background, thus making the decoding impossible. This technique can help also in this case: since the sunlight sensed in a certain time frame is the same with or without device illumination, two images can be acquired, one with, for example, blue light and another without additional illumination (e.g. only sunlight). The difference between them enables one to remove efficiently the background and leave only the barcode fluorescent dots-lines in the image. This means that the pair of images to use for this version would be blue and no additional illumination (image acquired by the device with the same exposure time and the light intensity set to 0). Although no additional illumination is employed it is still illumination with another wavelength in the sense of the disclosed embodiments, due to the sun providing a multi-wavelength spectrum.

The use of this technique can be coupled with an automatic adjustment of the exposure times until finding images where the sunlight sensed is not merging the barcode dots/lines. Once the right exposure time is achieved, images can be produced which allow using this technique to decode under strong sunlight. The use of this technique allows increasing the sunlight resilience.

A further scenario may consider black ink on PET caps with complex black and white background. Such backgrounds are "complex" because of the ink modulation produced by the changing background and because the black structures have comparable size to the dots (barcode elements). In these cases, acquiring an image with blue and IR, and applying this technique can help improving decoding performance as it helps removing the background even if the modulation is still present.

A still further scenario may consider invisible ink on labels with a strongly modulated background, where the technique can also be of help. In this example, a barcode can be strongly modulated due to the changing background. This is due to a deliberate printing out of the quiet zone and it can be difficult to decode the barcode. However by acquiring the IR image and applying the proposed technique the background can be almost completely removed so that the modulation is still present but its decodability is dramatically improved.

A further scenario may consider invisible ink on can bottoms with complex backgrounds. Invisible ink barcodes on can bottoms may yield images when scanned which are sometimes difficult to decode. This is due to the reflections coming from the background, the special texture of this background with grooves that maximize reflections at certain orientations and also due to the presence of characters in relief in the bottom of the can. As we can be seen, the red image that should be normally used to decode presents a complex background with some hotspots that yield barcode modulation. However, the result of applying this technique to it and using the appropriate linear combination generates a final image with an excellent contrast and easy to decode. In this case, the red image can be acquired using different parameters than for the blue and green color. This is to produce images that have a comparable background from the beginning of the calculation.

Although detailed embodiments have been described, these only serve to provide a better understanding of the invention defined by the independent claims, and are not to be seen as limiting.

The invention claimed is:

1. A method for identifying a one- or two-dimensional barcode in input image data, the method comprising:
   obtaining first image data of a first image of an object, said first image being acquired from said object using a first illumination wavelength;
   obtaining second image data of a second image of said object, said second image being acquired from said object using a second illumination wavelength being different from said first illumination wavelength;
   calculating a weighting factor based on a statistical processing of pixel values of the first image data and pixel values of the second image data; and
   generating third image data by calculating a weighted combination using the pixel values of said first image data, the pixel values of said second image data, and said weighting factor,
   wherein said weighting factor is calculated for approximating the pixel values of said second image date to the pixel values in said first image data in an image background area excluding said barcode.

2. The method of claim 1, wherein said statistical processing includes calculating a sum of pixel values of the first image data and a sum of pixel values of the second image data.

3. The method of claim 2, wherein said weighting factor is calculated as a ratio of said sum of pixel values of the first image data and said sum of pixel values of the second image data.

4. The method of claim 1, wherein said statistical processing includes calculating any one of a mean value, median value, extremum value, minimum value, maximum value, standard derivation value, and a linear regression value.

5. The method of claim 1, wherein different weighting factors are calculated for different regions of the image data, and said generating uses said different weighting factors for calculating said weighted combination.

6. The method of claim 1, wherein the method further includes generating a weighting matrix, each weighting matrix element being calculated based on a pixel value of said first image data and a corresponding pixel value of said second image data, and wherein calculating the weighted combination further uses said weighting matrix.

7. The method of claim 1, wherein the pixel values subject to said statistical processing are pixel values inside a selected region of the first and second image data.

8. The method of claim 1, wherein the pixel values subject to said statistical processing are pixel values selected with respect to a histogram fraction.

9. The method of claim 1, wherein said first image data and said second image data are selected from a plurality of image data, each image data of said plurality being acquired using a different illumination wavelength.

10. The method of claim 9, wherein said first image data and said second image data are selected based on their histogram properties.

11. The method of claim 1, further comprising calculating fourth image data based on multiplying said third image data by a scaling factor.

12. The method of claim 1, wherein said weighted combination is a weighted linear combination.

13. A computer program comprising code, said code, when being executed on a processing resource, implementing a method of claim 1.

14. A computer program product comprising a tangible data carrier storing in a non-volatile manner the computer program of claim 13.

15. A barcode reading device comprising processing resources configured to identify a one- or two-dimensional barcode in input image data and:
   to obtain first image data of a first image of an object, said first image being acquired from said object using a first illumination wavelength;
   to obtain second image data of a second image of said object, said second image being acquired from said object using a second illumination wavelength being different from said first illumination wavelength;
   to calculate a weighting factor based on a statistical processing of pixel values of the first image data and pixel values of the second image data; and
   to generate third image data by calculating a weighted combination using the pixel values of said first image data, the pixel values of said second image data, and said weighting factor,
   wherein said weighting factor is calculated for approximating the pixel values of said second image date to the pixel values in said first image data in an image background area excluding said barcode.

16. The barcode reading device of claim 15, wherein the processing resources are further configured to implement a method for identifying a one- or two-dimensional barcode in input image data.

17. The barcode reading device of claim 15, further comprising an imager and an illuminator for acquiring said first and second image.

* * * * *

UNITED STATES PATENT AND TRADEMARK OFFICE
CERTIFICATE OF CORRECTION

PATENT NO. : 9,495,572 B2  
APPLICATION NO. : 14/892672  
DATED : November 15, 2016  
INVENTOR(S) : Sempere et al.

Page 1 of 1

It is certified that error appears in the above-identified patent and that said Letters Patent is hereby corrected as shown below:

In the Claims

Column 13, Line 46 (Claim 1, Line 18) please change "date to" to -- data to --
Column 14, Line 53 (Claim 15, Line 19) please change "date to" to -- data to --

Signed and Sealed this
Tenth Day of April, 2018

Andrei Iancu
*Director of the United States Patent and Trademark Office*